United States Patent [19]
Haase

[11] Patent Number: 5,846,435
[45] Date of Patent: Dec. 8, 1998

[54] METHOD FOR DEWATERING OF SLUDGE

[76] Inventor: Richard Alan Haase, P.O. Box 623, Sugar Land, Tex. 77487-0623

[21] Appl. No.: 721,557

[22] Filed: Sep. 26, 1996

[51] Int. Cl.[6] .................................................. C02F 11/12
[52] U.S. Cl. ........................ 210/727; 210/728; 210/609
[58] Field of Search .................................. 210/609–727, 210/728, 732–736

[56] References Cited

U.S. PATENT DOCUMENTS

| | | | |
|---|---|---|---|
| 3,994,806 | 11/1976 | Rausch et al. | 210/728 |
| 4,690,971 | 9/1987 | Flesher et al. | 524/555 |
| 4,784,776 | 11/1988 | Mangravite, Jr. | 210/728 |
| 4,996,706 | 2/1991 | Gregor | 210/609 |
| 5,093,078 | 3/1992 | Hollis et al. | 210/753 |
| 5,112,603 | 5/1992 | Nadolsky et al. | 514/772.3 |
| 5,178,774 | 1/1993 | Payne et al. | 210/727 |
| 5,366,637 | 11/1994 | Turune | 210/728 |
| 5,529,700 | 6/1996 | Kierzkowski et al. | 210/752 |
| 5,643,462 | 7/1997 | Chen et al. | 210/727 |
| 5,681,480 | 10/1997 | Langley et al. | 210/727 |

*Primary Examiner*—Thomas G. Wyse
*Attorney, Agent, or Firm*—Maryam Bani-Jamali

[57] ABSTRACT

A chemical method is provided for the dewatering of biological sludge that has been digested by a thermophilic digestion process. Four versions of the chemical method are presented. The primary component in the four versions is a polyquaternary amine, preferably of the di-allyl di-methyl ammonium chloride (DADMAC) variety and from the epichlorohydrin di-methyl amine (epi-DMA) variety. By the first method, the polyquaternary amine is added directly, along with a cationic polyacrylamide, to the biological sludge. By the second method, the polyquaternary amine and an anionic polyacrylamide are added separately. By the third method, a quaternized polyacrylamide, having the polyquaternary amine as part of its polymer chain, is produced by copolymerization of acrylamide with monomers of polyquaternary amine quaternization and is added individually to the sludge. By the fourth method, the quaternized polyacrylamide from method three is added in concert with a cationic polyacrylamide to the sludge.

16 Claims, No Drawings

METHOD FOR DEWATERING OF SLUDGE

BACKGROUND OF THE INVENTION

1. Field of the Invention

This invention relates to a chemical method for the dewatering of biological sludge using polyquaternary amine as the primary component.

2. Description of the Prior Art

Polymeric quaternary ammonium compounds (also known as ionene polymers and polyquats), containing chlorides and bromides as anions, have been used for water clarification. Examples of polymeric quaternary ammonium compounds are the di-allyl di-methyl ammonium chloride (DADMAC) variety and the epichlorohydrin di-methyl amine (epi-DMA) variety. Further, cationic and anionic polyacrylamides, where the cationic or anionic moiety may result from various co-monomers in the polymerization process of polyacrylamide, have been applied in dewatering methods. Traditional polyacrylamide polymers do not contain polyquaternization from allyl chloride or from epi-DMA. Only within the last three years have polyacrylamides containing cationic monomers, based on allyl chlorides, been available. However, the copolymers of allyl chlorides with polyacrylamides produce small and weak flocs that are difficult to handle in traditional dewatering applications. In addition, it has been established that these copolymers do not compete effectively in the marketplace with traditional cationic polyacrylamides.

Meanwhile, traditional polyacrylamide polymers used for dewatering have been shown to perform very poorly in tests for dewatering of sludge that has been digested by any thermophilic digestion process. The goal of dewatering is to convert the sludge to a cake of such dryness that the dewatered sludge can be hauled as a solid to a final disposal site at minimal cost. To minimize the amount of sludge to be handled and to minimize dewatering and handling costs associated with the wasted sludge, most biological treatment systems waste the sludge to a digester or a digestion system. Digestion is a biological process during which the bacteria from the treatment system are consumed by other bacteria or by each other. Bacteria are used in activated sludge systems to consume biological oxygen demand (BOD), chemical oxygen demand (COD), total Kjeldahl nitrogen (TKN), total organic content (TOC) and ammonia from the wastewater, thereby making the wastewater fit for discharge into the environment. As the bacteria consume waste from the wastewater, the bacterial population grows in a ratio that is directly attributed to the constituents consumed by the bacteria from the wastewater. Therefore, the bacteria must be "wasted" from the activated sludge system to keep the activated sludge system operating efficiently and effectively. Digestion is applied to reduce the sludge volume by the consumption of the wasted bacteria from the treatment system by other bacteria or by each other.

Since the inception of the Clean Water Act of 1974, various cationic and anionic polyacrylamides have been commercially available and effective for the dewatering of biological sludge which, using a mesophyllic bacterial method, has undergone aerobic or anaerobic digestion. Until now, when mesophyllic bacteria are used, digester systems operate between about 60° F. (15° C.) and about 105° F. (40° C.). However, the aerobic and anaerobic digestion systems that operate between about 60° F. (15° C.) and about 105° F. (40° C.) have limited capabilities in the removal of pathogens from the biological sludge. These pathogens are detrimental to human and animal health and, thus, Federal and State regulations are being enacted to prevent the potential spread of pathogens from municipal sludge. Implementation of such regulations leads to costly handling and disposal of waste activated sludge.

Although there are different approaches to controlling pathogens in sewage sludge, each method relies on altering the sludge environment so that it becomes a less effective medium of microbial growth. At temperatures of at least about 115° F., active bacteria are of the thermophilic variety. Aerobic thermophilic microorganisms are used to carry out any required degradation in a thermophilic, exothermic process. The thermophilic digestion system relies on high operating temperatures (greater than about 55° C. or 131° F.) to achieve a substantial pathogen destruction. While a fraction of the energy released from the thermophilic process is stored intracellularly to form new cells, a larger fraction of the energy is released as heat into the environment. The released heat is the major heat source used to achieve the desired operating temperature. Experiments have shown that between about 8,500 and 13,000 BTU are released with the thermophilic digestion of one pound of volatile solids (bacteria). By maintaining a sufficient temperature for a required period of time, pathogenic organisms are reduced to below detectable levels.

Despite the disadvantages of mesophyllic bacteria, mesophyllic bacteria are preferable in relation to the dewatering of digested sludge. Mesophyllic bacteria naturally secrete a polysaccharide which acts as a tackifier providing a chemical mechanism of floc formation. This chemical mechanism is an aid to traditional cationic polyacrylamides to begin the dewatering process. However, thermophilic bacteria do not secrete a tackifying polysaccharide. Furthermore, thermophilic bacteria naturally repel each other. This repelling nature of thermophilic bacteria makes the dewatering of sludge from the thermophilic digestion process expensive and difficult.

Municipal wastewater generally contains four major types of human pathogenic organisms: bacteria, viruses, protozoa and helminths (parasitic worms). The actual species and density contained in the raw wastewater will depend on the health of the particular community and/or significant rain water runoff from animal sources. The level of pathogens contained in the untreated sludge will depend on the flow scheme and treatment type of the wastewater treatment method. For example, since pathogens are primarily associated with insoluble solids (volatile solids), untreated primary sludge has a higher density of pathogens than the incoming wastewater.

Since pathogens only present a danger to humans and animals through contact, one important aspect in land application of sewage sludge is to minimize, if not eliminate, the potential for pathogen transport. Minimization of pathogen transport is accomplished through reduction in vector attraction. Vectors are any living organisms capable of transmitting a pathogen from one organism to another either directly or indirectly by playing a key role in the life cycle of pathogens. Vectors that are specifically related to sewage sludge would most likely include birds, rodents and insects. The majority of vector attraction substances contained in domestic sewage sludge is in the form of volatile solids. If left unstabilized, these volatile substances will degrade, produce odor and attract pathogen carrying vectors. Therefore, the thermophilic digestion process achieves vector attraction reduction through biological degradation of volatile solids.

On Feb. 19, 1993, the National Sewage Sludge Use and Disposal Regulation (Chapter 40 Code of Federal Regulations Part 503, and commonly referred to as the 503 Regulations) was published in the Federal Register. In essence, the Regulation establishes several categories in terms of stabilization, pathogenic content, beneficial reuse and disposal practices for all land-applied sludge. Different classes of technology, which have been recognized by the U.S. EPA, have been established in meeting these categories. National standards that include heavy metal concentration limits, pathogenic limits, total hydrocarbon emissions from incinerators and management of sewage sludge use and disposal have been implemented in several areas. For a sludge to be liquid land-applied with no site restrictions, it must meet the following criteria: heavy metal concentration limits, vector attraction reduction, time-temperature function and pathogen testing. Since thermophilic digestion is a biological process, it cannot be used to reduce the heavy metal content of a waste stream.

Several patents, that have any relationship whatsoever to the present invention, have been issued in the past decade.

In U.S. Pat. No. 4,690,971, issued to Flesher et al. on Sep. 1, 1987, a process is presented where water absorbing polymers based on acrylic acid are utilized to absorb water from a granular solid mass to make the granular solid mass drier and more easily transportable.

In U.S. Pat. No. 5,093,078, issued to Hollis et al. on Mar. 3, 1992, a chemical method is presented where polymeric quaternary ammonium compounds are used to inhibit the growth of microorganisms in aquatic systems, to disinfect and sanitize surfaces and to disinfect the skin of animals, including humans.

In U.S. Pat. No. 5,112,603, issued to Nadolsky et al. on May 12, 1992, compositions comprising smectite clays and cationic polymers are claimed. The compositions are useful as thickening agents in aqueous systems.

In U.S. Pat. No. 5,366,637, issued to Turunc on Nov. 22, 1994, a method for dewatering the refuse ash generated by a municipal solid waste facility is presented where a copolymer and a nonionic surfactant selected from the group consisting of primary alcohol ethoxylates, secondary alcohol ethoxylates and alkyl phenol ethoxylates are added to the ash.

In U.S. Pat. No. 5,529,700, issued to Kierzkowski et al. on Jun. 25, 1996, a water treatment composition is presented comprising a water-dispersible ionene polymer and a water-dispersible di-lower-alkyl ammonium halide polymer and functioning as algistatic or algicidal agents when an effective amount of the composition is dispersed in a body of water.

These registered patents neither take into account dewatering of sludge nor relate to thermophilic digested sludge.

SUMMARY OF THE INVENTION

A primary object of the invention is to devise a method for dewatering of sludge.

Another object of the invention is to devise a method for dewatering of biological sludge that has been digested by a thermophilic digestion process.

An additional object of the invention is to devise a method for dewatering of biological sludge, that has been digested by a thermophilic digestion process, with polyquaternary amine being used as the primary component.

Yet another object of the invention is to minimize expenses and operating capital that are needed in a method for dewatering of biological sludge which has been digested by a thermophilic digestion process.

A final object of this invention is to significantly increase the efficiency of a method for dewatering of biological sludge that has been digested by a thermophilic digestion process.

Additional objects and advantages of the invention will be set forth in part in a detailed description which follows, and in part will be obvious from the description, or may be learned by practice of the invention.

The present invention relates to the dewatering of sludge from biological treatment systems of wastewater treatment facilities. Specifically, this invention is directed toward the removal of water from sludge that has been digested by a thermophilic digestion process.

It is to be understood that the descriptions of this invention are exemplary and explanatory, but are not restrictive, of the invention. Other objects and advantages of this invention will become apparent from the following specification and from any accompanying charts, tables, examples and drawings.

BRIEF DESCRIPTION OF CHARTS, TABLES, EXAMPLES AND DRAWINGS

Any accompanying charts, tables, examples and drawings which are incorporated in and constitute a part of this specification, illustrate examples of preferred embodiments of the invention and, along with the description, serve to explain the principles of the invention.

DETAILED DESCRIPTION OF THE PREFERRED EMBODIMENT

The present invention is described in connection with one or more preferred embodiments. However, it should be understood that the invention is not limited to those embodiments. In contrast, the invention includes all alternatives, modifications and equivalents as may be included within the spirit and scope of the specification and of the appended claims.

The present invention provides a method for effectively and efficiently dewatering any sludge, with emphasis on dewatering biological sludge from a thermophilic digestion process. The method, in addition to being capable of dewatering different types of sludges, can also dewater mixtures of different types of sludges. For example, results of tests have shown that the method can be applied to dewater a mixture of biological sludge with primary sludge.

Chemical means may be applied in one of four methods, all of which are a significant operational improvement and yield increased operational savings over dewatering methods utilizing traditional polyacrylamides. In some sample tests of the present invention, dewatering polymer(s) are added to the sludge from a thermophilic digestion process. However, it should be noted that the results obtained in the tests are not necessarily limited to sludge obtained from a thermophilic digestion process. Current technologies utilize traditional polyacrylamide dewatering chemistry that cannot effectively or efficiently dewater sludge from the thermophilic digestion process. The best performing traditional polyacrylamide technology utilized at the site of this invention was Nalco 9909, manufactured by Nalco Chemical, Inc. Usage of Nalco 9909 results in a dry polymer dosage often near 2,000 ppm and usually near 1,700 ppm treating sludge near 4 percent solids. Even at this dosage, plant throughput was at 20 percent of rated capacity.

Upon application of the present invention, plant throughput was increased by 300 percent (60 percent of rated capacity) and the dry polymer dosage requirement was reduced to near 850 ppm. The significant improvements of this invention in sludge dewatering are accomplished by the addition of polyquaternary amines to the sludge. Di-allyl di-methyl ammonium chlorides (DADMAC) and epichlorohydrin di-methyl amine (epi-DMA) are two preferred polyquaternary amines used in sludge dewatering. Both of these polyquaternary amine moieties have been found to provide sites for the dewatering of sludge from the thermophilic digestion process.

Several polyquaternary amines that are utilized in the present invention follow:

1. a di-allyl di-methyl ammonium chloride polymer, having a specific gravity of 1.02 at about 77° F. (25° C.), a solid content of 20.0±1.0 percent, a freezing point of about 27° F. (−3° C.) and viscosity of 1900±200 cps at 77° F. (25° C.), (referred to hereafter as CV 3750, which as other chemicals referred to in this application by a mark including the letters "CV", is sold and produced, by ClearValue, Inc. under the trademark CV™ that is being registered at the Patent and Trademark Office);
2. a di-allyl di-methyl ammonium chloride polymer, which is comparable to CV 3750 except for having a viscosity of 400±200 cps at 77° F. (25° C.), (referred to hereafter as CV 3620);
3. a di-allyl di-methyl ammonium chloride polymer, which is comparable to CV 3750 except for, having a viscosity of 2100±400 cps at 77° F. (25° C.), (referred to hereafter as CV 3650);

The higher molecular weight polyquaternary amines demonstrate improved performance.

Examples of polymers utilized for epi-DMA are CV 3230 series which have a specific gravity of 1.14 at about 77° F. (25° C.), an activity rate of 50±2 percent, a freezing point of about 20° F. (−7° C.) and a viscosity of 4000–9000 cps at 77° F. (25° C.). In all tests, the higher molecular weight products demonstrated superior performance.

These polyquaternary amine moieties are added via one of four methods. In the chemical methods used in this invention, combinations of polyquaternary amine and polyacrylamides are used for dewatering of the sludge. Each polyquaternary amine chemical component used in the chemical method is not large enough to create large enough flocs to dewater the sludge. The polyquaternary amine components, which create microflocs, are joined in a net and are agglomerated by the polyacrylamides, forming flocs for dewatering. Slower mixing and gentler agglomeration result in optimal size and strength of the flocs. In addition to an increase in size, the combinations of the chemical components affect the physical nature of the flocs.

Method one involves the addition of a polyquaternary amine directly to the sludge. Since the polyquaternary amine does not contain enough molecular weight for dewatering of the sludge, once the microflocs of sludge have formed from the polyquaternary amine, a cationic polyacrylamide is added to form a floc that will dewater well. The ratio of polyquaternary amine to cationic polyacrylamide appears to be near about 1:1 where the polyquaternary amine is of high molecular weight (e.g. from about 500,000 to about 3,000,000) and where the cationic polyacrylamide is of higher molecular weight (e.g. from about 5,000,000 to about 16,000,000). In a preferred embodiment, the ratio of the polymeric quaternary ammonium compound with respect to the cationic polyacrylamide is between about 1:10 to about 20:1. In a thermophilic digested sludge with a solids component of 4.4 percent, a total polymer dosage requirement of near 950 ppm is shown. As the solids component of the sludge increases or decreases, the amount of polyquaternary amine and polyacrylamide increases or decreases proportionately. The polymer concentration to solids component ratio (the ratio of the total polymer dosage requirement to the percentage of solids component of the sludge) may vary from about 50 ppm:1 percent to about 300 ppm:1 percent, depending on the sludge type.

Method two involves the addition of a polyquaternary amine directly sludge. Since the polyquaternary amine does not contain enough molecular weight dewatering of the sludge, an excess amount of the polyquaternary amine is added so that a noticeable cationic overcharge exists within the microfloc system. This cationic overcharge will exist when the supernatant water is rather clear and the size of the microflocs ceases to grow with chemical addition. This requires approximately 20 to 30 percent addition increase of the polyquaternary amine as compared to method one. An anionic polyacrylamide is then added for final floc formation. The ratio of polyquaternary amine to anionic polyacrylamide appears to be near 10:1 where the polyquaternary amine is of high molecular weight (e.g. from about 500,000 to about 3,000,000) and where the anionic polyacrylamide is of higher molecular weight (e.g. from about 5,000,000 to about 15,000,000) and is 40 percent anionic. As in method one, in a preferred embodiment, the ratio of the polymeric quaternary ammonium compound with respect to the cationic polyacrylamide is between about 1:10 to about 20:1. In a thermophilic digested sludge with a solids component of 4.4 percent, a total polymer dosage requirement of near 950 ppm is shown. As the solids component of the sludge increases or decreases, the amount of polyquaternary amine and polyacrylamide increases or decreases proportionately. The polymer concentration to solids component ratio may vary from about 50 ppm:1 percent to about 300 ppm:1 percent, depending on the sludge type. CV 6140, as an emulsion copolymer of polyacrylamide with acrylic acid, is a preferable candidate for method two. CV 6140 has a 40% anionic charge density, a specific gravity of 1.03 at about 77° F. (25° C.), a freezing point of approximately 32° F. (0° C.), viscosity ranging from about 400 cps to 1200 cps at about 77° F. (25° C.), an activity rate of about 40% and a flash point of approximately 150° F. (65° C.).

Method three involves the addition of a quaternized polyacrylamide where the cationic monomer of the polyacrylamide is derived from a polymeric quaternary ammonium compound. Allylic chloride and epichlorohydrin di-methyl amine are preferred sources for the cationic monomer. The most preferred embodiment of the quaternized polyacrylamide used is:

a copolymer of polyacrylamide with a cationic monomer that is quaternized in the polyacrylamide, the copolymer having a specific gravity of 1.2 at about 77° F. (25° C.), a freezing point of approximately 23° F. (−5° C.), viscosity of less than 1200 cps at about 40° F. (4.4° C.), an activity rate of about 38% and a flash point of about 275° F. (135° C.), (CV 5380).

The quaternized polyacrylamides are added directly to the sludge until floc formation develops. In a thermophilic digested sludge with a solids component of 4.4 percent, a total polymer dosage requirement of near 850 ppm is shown. As in method one and method two, in a preferred embodiment, the polymer concentration:solids ratio of the total polymer dosage requirement in relation to the percentage of solids component of the sludge is between about 50 ppm:1 percent to about 300 ppm:1 percent. As the solids component of the sludge increases or decreases, the amount of quaternized polyacrylamide increases or decreases proportionately. The quaternized polyacrylamide could be used in solution or in dry form.

Method four involves the addition of the polymer formed in method three in concert with a cationic polyacrylamide. The quaternized polyacrylamide, having the polymeric quaternary ammonium compound as part of its polymer chain, is produced by copolymerization of acrylamide with monomers of quaternization of the polymeric quaternary ammonium compound and is added to the sludge as a blend with the cationic polyacrylamide. The cationic polyacrylamide provides a very high molecular weight (e.g. from about 5,000,000 to about 16,000,000) to build a large strong floc that dewaters well. CV 5120, as an emulsion copolymer of polyacrylamide with a cationic monomer, is a preferable candidate for method 4. CV 5120 has a specific gravity of 1.03 at about 77° F. (25° C.), a freezing point of approximately 32° F. (0° C.), viscosity of approximately 1200 cps at about 77° F. (25° C.), an activity rate of about 40% and a flash point of approximately 150° F. (65° C.).

Even though method one, method two and method three provide significant improvements, the strongest floc in combination with the cleanest supernatant are produced by method four. In a thermophilic digested sludge with a solids component of 4.4 percent, a total polymer dosage requirement of near 850 ppm was shown. As in method one, the polymer concentration:solids ratio of the total polymer dosage requirement to the percentage of solids is preferably between about 50 ppm:1 percent to about 300 ppm:1 percent. As the solids component of the sludge increases or decreases, the amount of quaternized polyacrylamide and cationic polyacrylamide increases or decreases proportionately. The polymer ratio may vary from about 1:10 to about 10:1, depending on the sludge type. The polyacrylamide blend for dewatering is used as an emulsion or in dry form. The individual polymers (i.e. quaternized polyacrylamide and cationic polyacrylamide) are in solution or in dry form.

Method four is capable of individually dewatering any type of sludge. It is important to note that the capability of dewatering of the blend of quaternized polyacrylamide and cationic polyacrylamide is not limited to biological sludges that have been digested by a thermophilic digestion process. The blend of quaternized polyacrylamide with cationic polyacrylamide could dewater various types of sludges from numerous sources and any combinations of the sludges. For example, a blend of a biological sludge with primary sludge could be dewatered by method four.

EXAMPLE 1

A bench test was performed utilizing an electrical variable speed beaker stir system, commonly referred to as a jar test. 2000 ppm of CV 3750 (20% active) were added to 500 mnl of sludge from the thermophilic digestion system. The percentage of solids in the sludge was about 4.4 percent. The beaker was allowed to stir at 120 rpm for 30 seconds. At 30 seconds, the rpm was reduced to 90 and 1500 ppm of CV 5120 in a 0.25 percent solution were added to the beaker. After 15 seconds, the stir speed was slowed to 30 rpm and mixed for another 30 seconds. Large, heavy floc (e.g. with a diameter of at least about 4 mm) was formed with a somewhat cloudy supernatant.

EXAMPLE 2

A jar test was performed utilizing an electrical variable speed beaker stir system. 3000 ppm of CV 3650 (20% active) were added to 500 ml of sludge from the thermophilic digestion system. The percentage of solids in the sludge was about 4.4 percent. The beaker was allowed to stir at 120 rpm for 30 seconds. At 30 seconds, the rpm was reduced to 90 and 250 ppm of CV 6140 in a 0.25 percent solution were added to the beaker. After 15 seconds, the stir speed was slowed to 30 rpm and mixed for another 30 seconds. Large, heavy floc (e.g. with a diameter of at least about 4 mm) was formed with a very clear supernatant.

EXAMPLE 3

A jar test was performed utilizing an electrical variable speed beaker stir system. 1400 ppm of CV 3230 (epi-DMA with a high molecular weight, e.g. over 300,000, and 50% active) were added to 500 ml of sludge from the thermophilic digestion system. The percentage of solids in the sludge was about 4.4 percent. The beaker was allowed to stir at 120 rpm for 30 seconds. At 30 seconds, the rpm was reduced to 90 and 250 ppm of CV 6140 in a 0.25 percent solution were added to the beaker. After 15 seconds, the stir speed was slowed to 30 rpm and mixed for another 30 seconds. Large, heavy floc (e.g. with a diameter of at least about 4 mm) was formed with a very clear supernatant.

EXAMPLE 4

A jar test was performed utilizing an electrical variable speed beaker stir system. 850 ppm of CV 5380 (Polyacrylamide with a DADMAC cationic co-monomer) were added to about 500 ml of sludge from the thermophilic digestion system. The percentage of solids in the sludge was about 4.4 percent. The beaker was allowed to stir at 90 rpm for 15 seconds. At 15 seconds, the rpm was reduced to 30. The system was mixed for another 30 seconds. Small floc (e.g. with a diameter under about 3 mm) was formed with a very clear supernatant.

EXAMPLE 5

A bench test was performed utilizing a glass jar to mix the polymer with the sludge. 350 ppm of ClearValue CV 5380 (polyacrylamide with a DADMAC cationic co-monomer) along with 450 ppm of ClearValue CV 5120 (traditional polyacrylamide with a medium charge density) were added to about 100 ml of sludge from the thermophilic digestion system. The percentage of solids in the sludge was about 4.7 percent. The jar was gently shook for approximately 30 seconds. At 30 seconds, the results were observed. Large, strong floc (e.g. with a diameter of at least about 4 mm) was formed with a very clear supernatant.

Example 5 was repeated with varying cationic charge densities from the traditional polyacrylamide polymers. The best results were obtained with CV 5120.

EXAMPLE 6

A plant test was performed on Sep. 10, 1996 at the municipal wastewater treatment facility for the City of College Station Texas. This facility has a thermophilic digestion system as designed by Kruger, Inc. The average temperature of the digester is usually near 149° F. (65° C.). Dewatering is accomplished on a Sharpels Polymixer 75000 centrifuge. Polymer inversion is accomplished on a Polymixer 500 which is designed for a dry polymer. Normal plant operation requires 1500 to 2000 ppm of Nalco 9909 obtaining variable sludge cake dryness, a final centrate that is usually much over 200 ppm of total suspended solid (TSS) and a plant throughput of 10 to 15 gpm sludge.

The centrifuge was started up on CV 5380 having a polymer concentration of 800 ppm and a plant throughput of 30 gpm. The sludge produced was low on cake solids obtaining an average near 12 percent. The centrate was 100 to 200 TSS with nearly all of the total suspended solid from small floc (e.g. of a diameter of less than about 1 mm) that survived the centrifuge. Even though this was an operational improvement, the floc produced was weak for the type of treatment incurred within the centrifuge.

EXAMPLE 7

A plant test was performed on Sep. 10, 1996 at the municipal wastewater treatment facility for the City of College Station Texas. This facility has a thermophilic digestion system as designed by Kruger, Inc. The average temperature of the digester is usually near 65° C. Dewatering is accomplished on a Sharpels Polymixer 75000 centrifuge. Polymer inversion is accomplished on a Polymixer 500 which is designed for a dry polymer. Normal plant operation requires 1500 to 2000 ppm of Nalco 9909 obtaining variable sludge cake dryness, a final centrate that is usually much over 200 ppm of total suspended solid and a plant throughput of 10 to 15 gpm sludge. The centrifuge was started up on CV 5380 and Nalco 9909 with the CV 5380 having a polymer concentration of 400 ppm and the Nalco 9909 having a concentration of 450 ppm. The centrifuge was run between 45 and 55 gpm of sludge throughput. The produced sludge was over 18 percent cake solids. The centrate was less than 50 TSS.

Certain objects are set forth above and made apparent from the foregoing description and examples. However, since certain changes may be made in the above description and examples without departing from the scope of the invention, it is intended that all matters contained in the foregoing description and examples shall be interpreted as illustrative only of the principles of the invention and not in a limiting sense. With respect to the above description and examples then, it is to be realized that any descriptions and examples deemed readily apparent and obvious to one skilled in the art and all equivalent relationships to those stated in the examples and described in the specification are intended to be encompassed by the present invention.

Further, since numerous modifications and changes will readily occur to those skilled in the art, it is not desired to limit the invention to the exact construction and operation shown and described, and accordingly, all suitable modifications and equivalents may be resorted to, falling within the scope of the invention. It is also to be understood that the following claims are intended to cover all of the generic and specific features of the invention herein described, and all statements of the scope of the invention which, as a matter of language, might be said to fall in between.

What is claimed as invention is:

1. A method for dewatering biological sludge that has been digested by a thermophilic digestion process comprising:
   a. adding polymeric quaternary ammonium compounds, as primary component, to the biological sludge; and
   b. adding polyacrylamide to the biological sludge;
such that any combinations of the polymeric quaternary ammonium compounds and of the polyacrylamides enhance dewatering of the sludge.

2. The method for dewatering biological sludge according to claim 1, wherein the polymeric quaternary ammonium compounds are from di-allyl di-methyl ammonium chloride (DADMAC) family.

3. The method for dewatering biological sludge according to claim 1, wherein the polymeric quaternary ammonium compounds are from epichlorohydrin di-methyl amine (epi-DMA) family.

4. The method for dewatering biological sludge according to claim 1, wherein the polymeric quaternary ammonium compound is added directly to the sludge and, upon formation of microflocs of the sludge from the polymeric quaternary ammonium compound, a cationic polyacrylamide is added to form a floc that dewaters the sludge.

5. The method for dewatering biological sludge according to claim 4, wherein the polymeric quaternary ammonium compound and the cationic polyacrylamide are in an approximately 1:1 ratio, with the cationic polyacrylamide having a higher molecular weight than the polymeric quaternary ammonium compound does.

6. The method for dewatering biological sludge according to claim 4, wherein ratios of the polymeric quaternary ammonium compound with respect to the cationic polyacrylamide range from about 1:10 to about 20:1.

7. The method for dewatering biological sludge according to claim 4, wherein polymer concentration to solids ratio of total polymer dosage requirement in relationship to percentage of solids component of the sludge is between about 50 ppm:1 percent and about 300 ppm:1 percent.

8. The method for dewatering biological sludge according to claim 1, wherein the polymeric quaternary ammonium compound is added directly to the sludge, in an amount sufficient to cause formation of a cationic overcharge within a developed microfloc system, and an anionic polyacrylamide is then added for final floc formation.

9. The method for dewatering biological sludge according to claim 8, wherein the polymeric quaternary ammonium compound is added to the sludge in a quantity that is approximately 20 to approximately 30 percent higher than any quantity of the polymeric quaternary ammonium compound that is added in claim 4.

10. The method for dewatering biological sludge according to claim 8, wherein the polymeric quaternary ammonium compound and the anionic polyacrylamide are in an approximately 10:1 ratio, with the anionic polyacrylamide having a higher molecular weight than the polymeric quaternary ammonium compound does.

11. The method for dewatering biological sludge according to claim 10, wherein the anionic polyacrylamide is about 40% anionic.

12. The method for dewatering biological sludge according to claim 8, wherein ratios of the polymeric quaternary ammonium compound to the anionic polyacrylamide range from about 1:10 to about 20:1.

13. The method for dewatering biological sludge according to claim 8, wherein polymer concentration to solids ratio of total polymer dosage requirement in relationship to percentage of solids component of the sludge is between approximately 50 ppm:1 percent and approximately 300 ppm:1 percent.

14. The method for dewatering biological sludge according to claim 1, wherein the biological sludge is mixed with primary sludge.

15. A composition for dewatering biological sludge according to claim 1 comprising polymeric quaternary ammonium compounds, as primary component, and polyacrylamide, said components being present in the composition in a ratio to enable the composition to function as an agent for dewatering biological sludge from a thermophilic digestion process.

16. The method for dewatering biological sludge according to claim 1, wherein the polyacrylamide and the polymeric quaternary ammonium compounds are used in solution or in dry form.

* * * * *

(12) EX PARTE REEXAMINATION CERTIFICATE (9813th)
United States Patent
Haase

(10) Number: US 5,846,435 C1
(45) Certificate Issued: Aug. 27, 2013

(54) METHOD FOR DEWATERING OF SLUDGE

(75) Inventor: Richard Alan Haase, Sugar Land, TX (US)

(73) Assignee: Clearvalue Technologies, Inc., Missouri City, TX (US)

Reexamination Request:
No. 90/005,710, Apr. 24, 2000

Reexamination Certificate for:
Patent No.: 5,846,435
Issued: Dec. 8, 1998
Appl. No.: 08/721,557
Filed: Sep. 26, 1996

(51) Int. Cl.
*C02F 11/12* (2006.01)

(52) U.S. Cl.
USPC .................. 210/727; 210/609; 210/728

(58) Field of Classification Search
USPC .......................... 210/727, 728, 609
See application file for complete search history.

(56) References Cited

To view the complete listing of prior art documents cited during the proceeding for Reexamination Control Number 90/005,710, please refer to the USPTO's public Patent Application Information Retrieval (PAIR) system under the Display References tab.

*Primary Examiner* — Andres Kashnikow

(57) ABSTRACT

A chemical method is provided for the dewatering of biological sludge that has been digested by a thermophilic digestion process. Four versions of the chemical method are presented. The primary component in the four versions is a polyquaternary amine, preferably of the di-allyl di-methyl ammonium chloride (DADMAC) variety and from the epichlorohydrin di-methyl amine (epi-DMA) variety. By the first method, the polyquaternary amine is added directly, along with a cationic polyacrylamide, to the biological sludge. By the second method, the polyquaternary amine and an anionic polyacrylamide are added separately. By the third method, a quaternized polyacrylamide, having the polyquaternary amine as part of its polymer chain, is produced by copolymerization of acrylamide with monomers of polyquaternary amine quaternization and is added individually to the sludge. By the fourth method, the quaternized polyacrylamide from method three is added in concert with a cationic polyacrylamide to the sludge.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-16 are cancelled.

\* \* \* \* \*